US006493412B1

(12) United States Patent
Boyd et al.

(10) Patent No.: US 6,493,412 B1
(45) Date of Patent: Dec. 10, 2002

(54) METHOD OF CALIBRATING EXIT THERMOCOUPLES IN A NUCLEAR REACTOR

(75) Inventors: William A. Boyd, Carnegie, PA (US); Toshia Morita, Pittsburgh, PA (US); David J. Krieg, Plum, PA (US)

(73) Assignee: Westinghouse Electric Company LLC, Pittsburgh, PA (US)

( * ) Notice: Subject to any disclaimer, the term of this patent is extended or adjusted under 35 U.S.C. 154(b) by 0 days.

(21) Appl. No.: 09/686,427

(22) Filed: Oct. 11, 2000

(51) Int. Cl.[7] .......................... G21C 17/00; G01K 19/00
(52) U.S. Cl. ...................... 376/247; 376/245; 376/254; 374/1
(58) Field of Search ................................ 376/245, 247, 376/259, 246, 254, 260; 324/179; 374/1, 100; 702/181

(56) References Cited

U.S. PATENT DOCUMENTS

| | | | | |
|---|---|---|---|---|
| 4,440,716 A | * | 4/1984 | Smith | 374/1 |
| 4,774,049 A | * | 9/1988 | Impink, Jr. et al. | 376/245 |
| 4,839,134 A | * | 6/1989 | Impink et al. | 376/216 |
| 5,024,801 A | * | 6/1991 | Impink et al. | 376/216 |
| 5,078,957 A | * | 1/1992 | Tower et al. | 376/245 |
| 5,490,184 A | * | 2/1996 | Heibel | 376/216 |
| 5,586,066 A | * | 12/1996 | White et al. | 364/576 |
| 5,682,410 A | * | 10/1997 | McGrady et al. | 376/246 |
| 5,829,876 A | * | 11/1998 | Schwartz et al. | 374/1 |
| 6,061,412 A | * | 5/2000 | Stucker et al. | 376/217 |
| 6,310,929 B1 | * | 10/2001 | Hirukawa | 376/245 |

FOREIGN PATENT DOCUMENTS

| | | | | |
|---|---|---|---|---|
| CA | 1083268 | * | 5/1980 | 376/247 |
| EP | 512866 A1 | * | 11/1992 | 376/247 |

* cited by examiner

*Primary Examiner*—Michael J. Carone
*Assistant Examiner*—Daniel Matz

(57) ABSTRACT

The exit thermocouples of a pressurized water reactor (PWR) are calibrated by recording the thermocouple temperature measurements periodically during power ascension of the reactor together with a predicted power at the corresponding locations at the same time determined by a three-dimensional analytical nodal model of the core at the same core average power. The temperature measurements are converted to local core power values which are then divided into the corresponding predicted powers for the corresponding locations to arrive at mixing factors which are fitted to a selected function of core power. These mixing factors are recorded and subsequently applied to local power values calculated from measured exit thermocouple temperatures to adjust the three-dimensional nodal model power. Periodically, the mixing factors are adjusted by using flux map data to update the three-dimensional analytical nodal model power to generate a reference power distribution, calculating updated mixing factors using the current thermocouple temperature measurement taken at the same time and therefore the same average core power, and the reference power distribution, and then shifting the mixing factor functions of core power accordingly to pass through the updated mixing factors.

16 Claims, 3 Drawing Sheets

METHOD OF CALIBRATING EXIT THERMOCOUPLES IN A NUCLEAR REACTOR

BACKGROUND OF THE INVENTION

1. Field of the Invention

This invention relates to a system and method for calibrating the exit thermocouples used in a pressurized water reactor in connection with generating online three-dimensional power distributions within the reactor core.

2. Background Information

A pressurized water reactor has a large number of elongated fuel assemblies mounted within an upright reactor vessel. Pressurized coolant is circulated through the fuel assemblies to absorb heat generated by nuclear reactions in fissionable fuel contained in the assemblies. An ex-core detector system mounted outside of the reactor vessel provides a measure of the average power generated by the fuel assemblies. However, it is also important to know the distribution of power through the core to assure that operating limits are not exceeded. The power distribution is affected by a number of factors, such as for instance, the degree of insertion of control rods into the fuel assemblies.

Systems have been developed to determine the power distribution in a pressurized water reactor. One system known as BEACON consists of a set of coupled, yet independent, computer software programs, which execute concurrently on one or more engineering workstations to generate on-line three-dimensional power distributions in the reactor core. The BEACON system uses an incore flux map together with a three-dimensional analysis to yield a continuously measured three-dimensional power distribution. The functions performed by BEACON include core monitoring and core analysis including predictive functions such as on-line shutdown margin evaluations, estimated critical condition calculations and load maneuver simulation.

The flux maps are generated by running moveable detectors through instrumentation thimbles in some, but not all, of the fuel assemblies. The data generated is processed to produce a map of core power distribution. While such flux maps provide the most accurate core power distributions, they are only performed during startup and at intervals typically not more frequent than once a month during operation of the reactor. It takes several hours to complete data collection for one flux map and the reactor needs to be at a specified steady state condition during this period. Also, these detectors would be quickly depleted if used continuously. As a result, the flux maps are employed to calibrate the three-dimensional analytical nodal model.

In order to maintain the accuracy of the three-dimensional power distribution information between flux mappings, other instrumentation has been utilized for measuring power distribution within the core. The power developed in individual fuel assemblies can be determined by the change in enthalpy of the coolant as it passes through the assembly. Enthalpy, in turn, is a function of the temperature rise over the fuel assembly, the pressure of the coolant and certain properties of the coolant. The coolant pressure remains fairly constant, but in any event, is a measured quantity, and the properties of the coolant are known. The rise in temperature is measured by inlet temperature sensors which measure the temperature of the coolant as it circulates back to the reactor core. Average inlet coolant temperature to the fuel assemblies can be measured accurately. Some but not all, of the fuel assemblies are fitted with exit thermocouples. The enthalpy change in the instrumented assemblies can be calculated by measuring the temperature rise over the fuel assembly. If the coolant flow rate of the assembly is accurately known, then the power produced in the assembly is accurately obtained. The fuel assembly in a pressurized water reactor does not have an enclosure channel which prevents the coolant from cross flowing among the neighboring assemblies.

The effect of the cross flow is characterized by the mixing factor which is defined as the ratio of the measured assembly power and the power determined from the measured enthalpy rise by the thermocouple. These mixing factors depend on the thermocouple location in the core and the reactor power level. These measured mixing factors are used to update the three-dimensional analytical nodal model. Power distribution uncertainties are evaluated by generating a standard deviation of the mixing factors from each thermocouple. These uncertainties are applied by the BEACON system to the measured power results.

The thermocouples can vary substantially in performance and need to be calibrated. Prior to this invention, thermocouple mixing factors and mixing factor standard deviation have been obtained using data collected mostly at full power during the previous fuel cycle. The mixing factors have been calculated as the ratio between a measured power determined from a periodically generated flux map, and the enthalpy rise determined by the thermocouples. These mixing factors have been power independent coefficients for each thermocouple. Most importantly, when a fuel cycle is completed, and the reactor is refueled and serviced, changes to the fuel assembly distribution as loaded in the core and the thermocouple instrumentation results in inappropriate mixing factors for the next cycle.

There is a need therefore for an improved method and system for calibrating the exit thermocouples used in monitoring systems for pressurized water reactors.

There is a particular need for such a method and apparatus which can determine the quality or uncertainty of the thermocouple mixing factors for conditions of the current fuel cycle rather than relying on data from a past cycle.

SUMMARY OF THE INVENTION

These needs, and others, are satisfied by the invention which is directed to a method for calibrating the exit thermocouples provided in a pressurized water reactor. Temperatures measured by each of the thermocouples are repetitively recorded during power ascension in the reactor. As used throughout, power ascension means an increase of power of at least about 50% and includes initial power ascension from startup, as well as subsequent power increases of at least about 50%. Calibration factors and associated statistics are generated for each thermocouple from the measured assembly power during the power ascension as a function of core average power. These correction factors are applied to correct subsequent measurements of temperature taken by the thermocouples. Specifically, the calibration factors generated are the mixing factors. The statistics are used to calculate the standard deviations of the mixing factors and the related quality or uncertainty of the associated thermocouple data. These uncertainties are applied to the measured power results from the thermocouples.

For each temperature measurement for each thermocouple recorded during the power ascension, a corresponding predicted power for the thermocouple at the time of the temperature measurement is stored with the temperature measurement along with the core average power. It is preferred that the measurements of thermocouple temperature be recorded for discrete ranges of power during ascension. The number of measurements stored for each power range is limited, so that should the power level be leveled off for any reason during power ascension, the data is not distorted. The predicted power is generated from a three-dimensional analytical nodal model of the reactor core. The mixing factors are generated by converting the measured temperature into a thermocouple power value and dividing this thermocouple power value into the corresponding predicted power. The power dependent mixing factors for each of the thermocouples are fitted to a selected mixing factor function of reactor power. Standard deviations of the fitted to actual mixing factors are generated for each thermocouple. All of the standard deviations are then fitted to a single function of assembly power.

Periodically, the selected mixing factor function of reactor power is adjusted. This adjustment is carried out by generating a flux map of the reactor core using moveable detectors. This flux map is used to update the three-dimensional analytical nodal model to generate a reference measured power distribution. A thermocouple measured temperature for each thermocouple taken at the same conditions at which the flux map was generated is converted to a reference thermocouple power. An associated reference mixing factor is then generated for each thermocouple by dividing the reference measured power for the thermocouple determined from the reference measured power distribution by the reference thermocouple power. The selected mixing factor function for each thermocouple is then adjusted to pass through the associated reference mixing factor at the core power. Such periodic adjustment can be carried out multiple times during initial power ascension. It can also be performed at full power and then periodically after initial calibration whenever a flux map is generated.

BRIEF DESCRIPTION OF THE DRAWINGS

A full understanding of the invention can be gained from the following description of the preferred embodiments when read in conjunction with the accompanying drawings in which.

DESCRIPTION OF THE PREFERRED EMBODIMENTS

Figure 1:
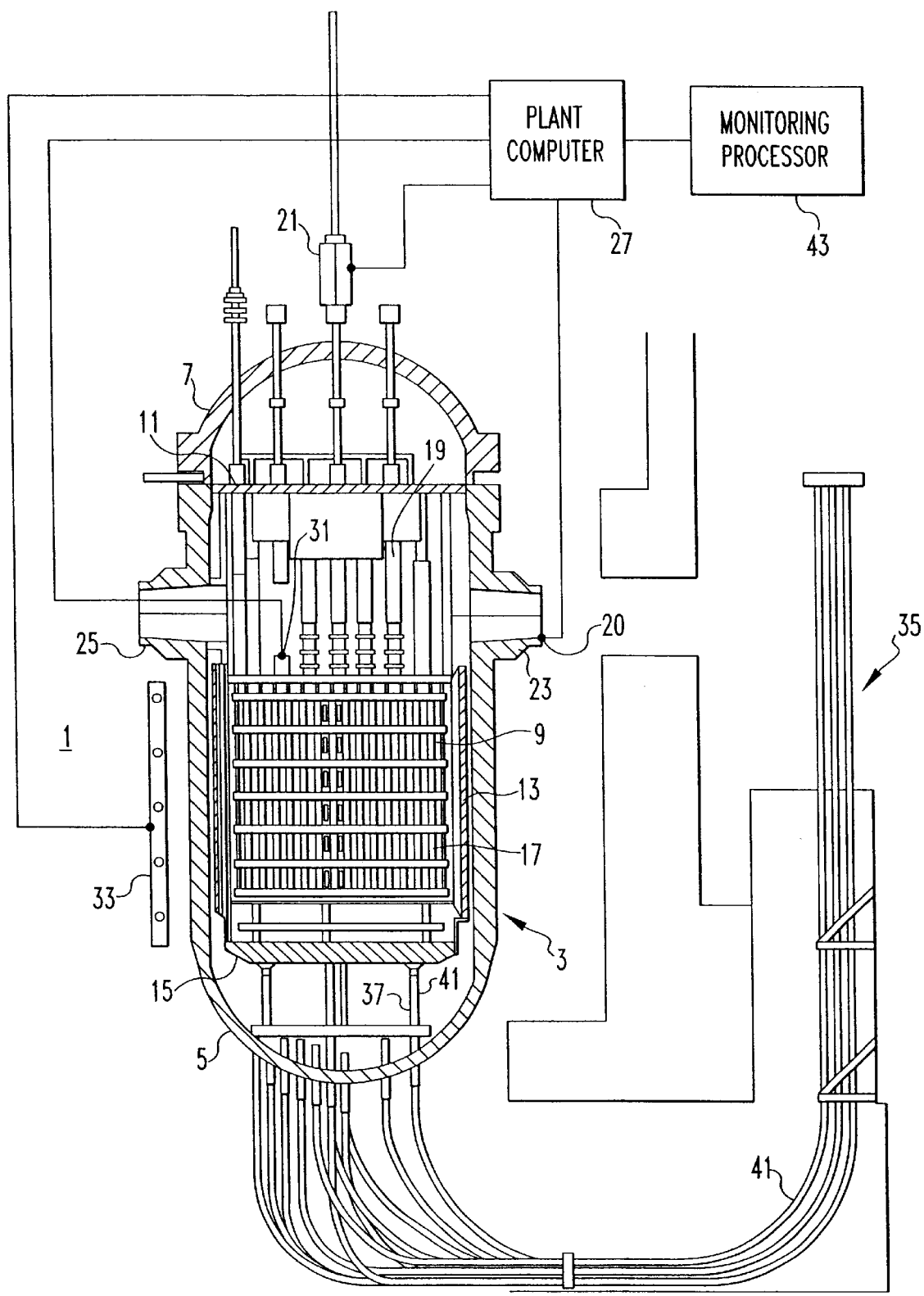
FIG. 1 is an illustration, partially in section and partially schematic of a PWR incorporating the invention.

FIG. 1 illustrates a pressurized water reactor (PWR) 1 which includes an upright cylindrical pressure vessel 3 with a hemispherical bottom 5 and lid 7. A reactor core 9 is suspended within the reactor vessel by a structure which includes an upper support plate 11, a core barrel 13 and a lower support plate 15. The reactor core is made up of a plurality of elongated fuel assemblies 17 each including fissionable material contained within a number of fuel rods (not shown). Clusters of control rods 19 each positioned by a drive mechanism 21 located above the lid 5 are inserted into the fuel assemblies 17 as one means of controlling the reactivity of the fissionable material. Reactor coolant which is circulated by reactor coolant pumps (not shown) enters an inlet nozzle 23, flows down around the core barrel 13, upward through the lower support plate 15 and passes upward through the fuel assemblies 17 where it is heated by the nuclear reactions within the fissionable material. The heated coolant then passes outward through the outlet nozzle 25 for circulation through steam generators (not shown) before returning to the inlet nozzle 23. Typically, a reactor will have two to four loops each having an inlet nozzle and an exit nozzle. The reactor coolant is maintained at a pressure typically about 2,250 psi by the reactor coolant pumps. The hot coolant from the reactor core is passed through the steam generators where it gives up heat.

Various parameters of the process are tracked by a plant computer 27. Among the parameters tracked are the inlet temperature of the coolant measured by thermocouples 29 at each of the inlets. As the coolant entering through each of the inlets mixes as it passes downward between the vessel wall and the core barrel, and continues to mix in the lower portion of the vessel, the temperature of the coolant entering each of the fuel assemblies 17 is fairly uniform. Hence, the temperature measured by all of the inlet thermocouples 29 are averaged to provide an average inlet temperature. A number of the fuel assemblies 17, but not all, are provided with exit thermocouples 31 which measure the temperature of the coolant as it leaves the fuel assemblies. Additional measurements include axial power offset which is measured by a strip of excore power detectors 33 extending along the outside of the reactor vessel 3. Numerous other parameters are tracked by the plant computer; however, these are the ones pertinent to an understanding of the present invention.

The PWR 1 shown in FIG. 1 is also equipped with a moveable in-core detector system 35, which includes a number of moveable neutron detectors 37, each mounted on a drive cable 39 which is pushed through a thimble guide tube 41 to run the moveable neutron detectors upward through the fuel assemblies in thimbles (not shown). Measurements made by the moveable neutron detector as they pass along the fuel assemblies are used to generate a flux map which is an accurate measure of power distribution within the reactor core 9. As mentioned, these detectors cannot be used on a continuous basis, and therefore other means are needed to determine the power distribution within the reactor core between flux mappings.

The exemplary PWR 1 utilizes the BEACON system to continuously monitor core power distribution. The BEACON system is resident in the monitoring processor 43 which can include one or more engineering workstations. As previously discussed, the BEACON system uses the in-core flux map together with a three-dimensional model of the reactor core to continually provide a three-dimensional power distribution within the reactor core. Between flux mappings, the three-dimensional nodal model power is updated for actual conditions by determining the power being developed in the individual fuel assemblies using temperature measurements generated between the inlet thermocouples 29 and exit thermocouples 31. The power developed in the fuel assemblies instrumented with an exit thermocouple 31 is determined by the change in enthalpy of the coolant as it passes through the assembly. As discussed, enthalpy is a function of the temperature rise over the fuel assembly, the pressure of the coolant and certain properties of the coolant. The coolant pressure is a measured quantity and the properties of the coolant are known. The rise in temperature is determined by subtracting the inlet temperature from the temperature measured by the associated exit thermocouple. As will be seen, these measured power values are used to periodically update the three-dimensional analytical nodal model power.

The coolant cross flows between assemblies (mixing factors) can vary substantially and need to be updated. In accordance with the invention, the thermocouples are calibrated using data generated during initial power ascension in the current fuel cycle. Thus, the temperatures measured by each of the exit thermocouples 31 are repetitively recorded as power increases during initial power ascension of the reactor. Mixing factors are generated for each thermocouple from the measured power during initial power ascension as a function of the core average power. The mixing factors are applied to subsequent measurements of temperature taken by the thermocouples.

In the exemplary embodiment of the invention, these temperature measurements are collected every fifteen minutes during initial power ascension, although it is to be understood that other intervals between measurements can be utilized. For each temperature measurement for each exit thermocouple recorded during initial power ascension, a corresponding predicted assembly power generated using the three-dimensional analytical nodal model is stored with the temperature measurement along with the core average power as measured by, for instance, the excore detector system. These periodic measurements are stored in bins defined by selected ranges of power. For instance, in the exemplary system the bins cover a range of 5% of rated power, although other bin sizes could be utilized. The purpose of utilizing bins is to provide a convenient way of storing the data and analyzing the statistical variation of the data over discrete power ranges.

It is common to perform several flux mappings during initial power ascension of the reactor. For instance, the incore detector system 35 can be activated at 30%, 50%, 75% and 100% power. At each flux mapping, the exit thermocouples 31 can be calibrated. Each of the exit thermocouple temperature measurements is converted to a thermocouple power value in the manner discussed above. This thermocouple power value is then divided into the corresponding predicted power stored with the thermocouple temperature reading to generate a mixing factor. The mixing factors calculated for each of the exit thermocouples 31 are fitted to a selected mixing factor function of reactor power. At each of the power level 30, 50, 75 and finally at 100%, additional data is available and used to generate a new fit to the selected mixing factor function. The mixing factor function can range from a constant at lower power levels, to a linear function, at intermediate levels and a polynominal function at higher levels. In the exemplary embodiment, the selected mixing factor function of reactor power is 2nd order above about 90% and 1st order or a constant below about 90% reactor power. For the 2nd order function to be applied, the collected thermocouple data must extend over about a 70% power range. Subsequent to calibration, the thermocouple temperature measurements are used together with the mixing factors to update the three-dimensional analytical nodal model power by determining adjusted values for the predicted power at the corresponding locations. Such calculations are performed in the exemplary embodiment of the invention once each minute.

Each time a flux map is generated, the selected mixing factor function as a function of reactor power for each fuel assembly is adjusted. A flux map of the reactor core is used to update the three-dimensional analytical nodal model power to generate an incore measured power distribution which we will call reference. The thermocouple measured temperatures for each exit thermocouple taken at the same conditions at which the flux map was generated is converted to a reference thermocouple power. An associated reference mixing factor is generated for each thermocouple by dividing the assembly reference measured power at the thermocouple location by the reference thermocouple power at the same location. The selected mixing factor function for each thermocouple is then adjusted to pass through the associated thermocouple reference mixing factor at the core power. Such periodic adjustment can be carried out multiple times during initial power ascension. It is also performed at full power and then periodically after initial power ascension whenever a flux map is generated.

Standard deviations of the mixing factors for each thermocouple are calculated. This is done by evaluating the difference between the mixing factors calculated directly from the collected data and the mixing factors calculated from the mixing factor functions. The standard deviations for all of the temperature measurements for all of the exit thermocouples are then fitted to a single function of assembly power. The standard deviation information is used by the BEACON system to calculate uncertainties applied to the measured powers. The standard deviation is also used to establish the quality of the thermocouple data which is used to verify the reliability of the individual thermocouples. Thermocouples that deviate too much from the norm can be ignored in future power measurement calculations.

Figure 2:
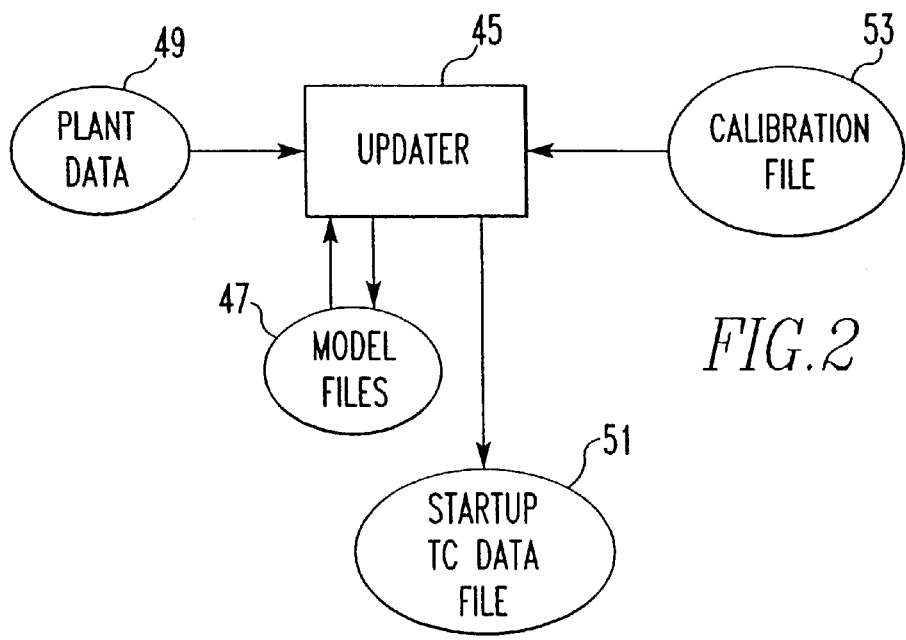
FIG. 2 illustrates schematically data flow during the startup phase of operation of the PWR of FIG. 1 in accordance with the invention.

A more specific understanding of the invention can be gained from FIGS. 2–5. FIG. 2 illustrates data flow during the plant startup or initial power ascension phase. An UPDATER background process 45 run in the monitoring processor 43 executes and depletes the analytical nodal model represented by the model files 47 approximately every 15 minutes. The UPDATER process 45 has access to plant data 49 such as the sensor information and the analytical nodal model represented by the files 47. The UPDATER process 45 determines the predicted power for each fuel assembly from the analytical nodal model and calculates the measured thermocouple power using the inlet temperatures and the assembly thermocouple measurements. During initial power ascension of the plant, the predicted power and the thermocouple power for every thermocouple location along with the core relative power is written to a startup thermocouple data file 51 every 15 minutes for storage for later processing. This provides thermocouple data as a function of assembly power and core relative power to be used in the analysis. The plant data file 49 contains inlet temperatures, exit thermocouple temperatures, core power level, control rod positions, excore signals, and pressure. The startup thermocouple data file 51 stores the core power level, predicted power and thermocouple power in the instrumented locations. The calibration file 53 includes thermocouple mixing factor functions, coefficients, standard deviation function coefficients, date and time of the calibration and other calibration parameters used in the core monitoring process.

Figure 3:
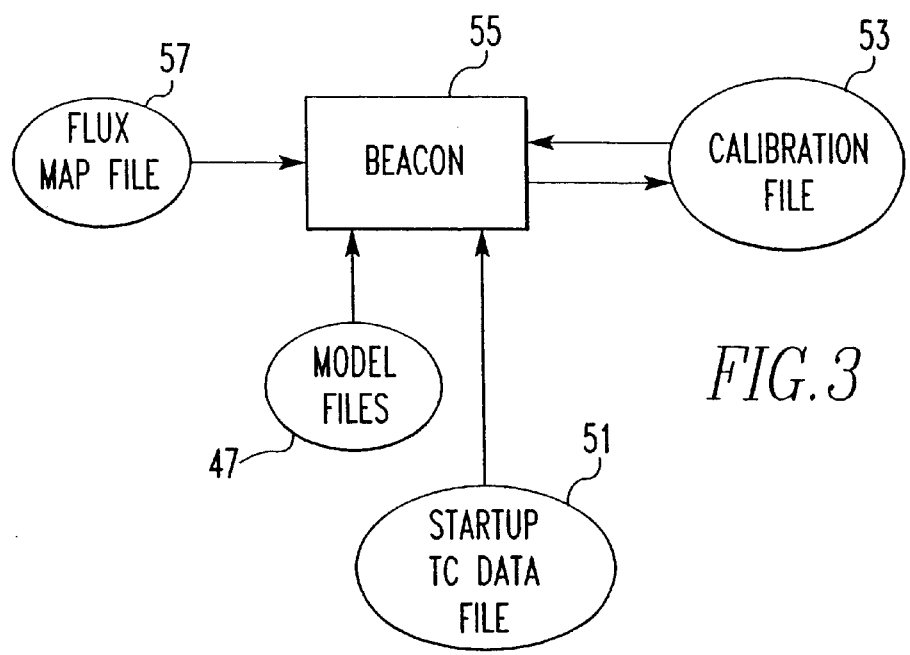
FIG. 3 illustrates schematically data flow for the full calibration phase of operation of the PWR of FIG. 1 using data generated in the startup phase illustrated in FIG. 2 in accordance with the invention.

Periodically during initial power ascension, such as at 30%, 50%, 75% and 100% power, a flux map measurement is made and a full thermocouple calibration is performed as illustrated in FIG. 3. The BEACON foreground process 55 is the interface used to generate the calibration information.

The data required for this phase is the thermocouple information collected during the plant startup and stored in the startup thermocouple data file 51. This collected thermocouple data is used to generate the mixing factors for each thermocouple which are fitted to the selected fitting function. These functions are then adjusted using the flux map data. Additional data required is a set of moveable detector measurement data stored in a flux map file 55, the nodal model consistent with the conditions of the moveable detector measurements provided by the model files 47 and a set of thermocouple data consistent with the moveable detector information. The calibration process analyzes the moveable detector information from the flux map file 57 to generate a reference measured power distribution. This reference measured power distribution is assumed to be truth. Using the inlet temperature and the measured thermocouple temperatures consistent with the time frame that the moveable detector measurements were taken, a second relative assembly power in the assembly can be determined based on the exit thermocouples (thermocouple measured power). The ratio of the power in the assembly from the reference measured power distribution and the thermocouple measurement power is the mixing factor at the relative core power. This reference mixing factor at the relative core power for each fuel assembly is used to modify the previously established mixing factor functions so that the shape passes through this mixing factor just calculated using the reference measured distribution. The flux map reference file 57 includes the moveable detector measurement trace data, the thermocouple temperatures, excore signals, core power level, rod positions, and inlet temperatures all at map conditions.

Figure 4:
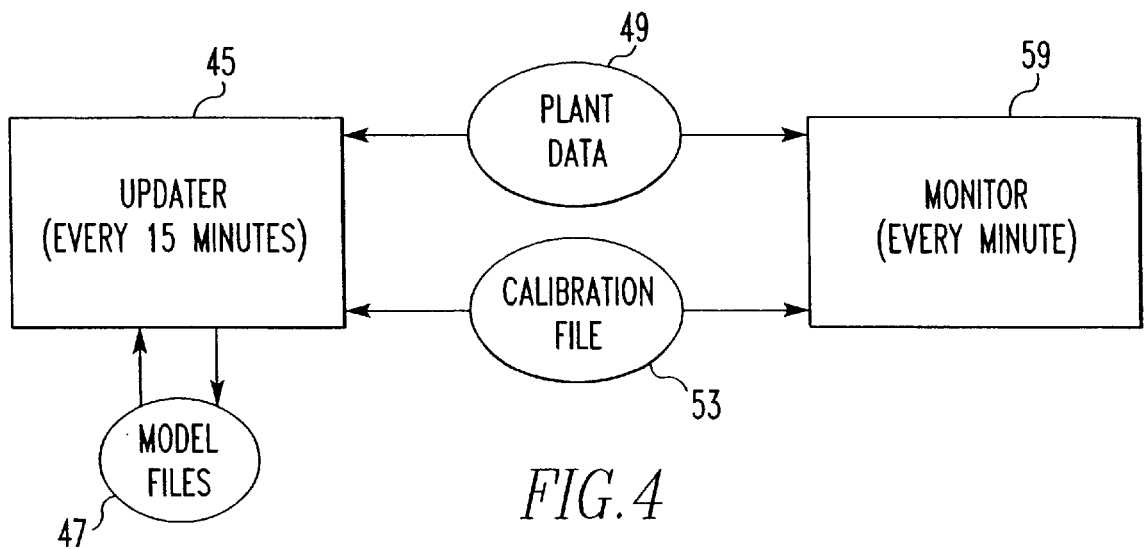
FIG. 4 illustrates schematically data flow during the normal phase of operation of the PWR of FIG. 1 in accordance with the invention.

During normal operation, as illustrated in FIG. 4, the UPDATER process 45 and a MONITOR process 59 both access the mixing factor and standard deviation coefficients from the calibration file 53 to determine thermocouple quality factors, measured power distribution and uncertainties applied to the results. The UPDATER process runs every 15 minutes typically and depletes the fuel, burnable absorbers and fission products based on the accumulated core burnup. The thermocouple mixing factors and quality factors are used in the process to determine the core measured power distribution. The MONITOR process runs every minute in between the UPDATER runs and applies the thermocouple mixing factors and quality factors to the measured thermocouple temperatures to determine the changes in the core measured power distribution determined by the UPDATER process. The mixing factors and standard deviation coefficients are a function of core relative power and assembly power, respectively, and are generated for the current operating cycle.

Figure 5:
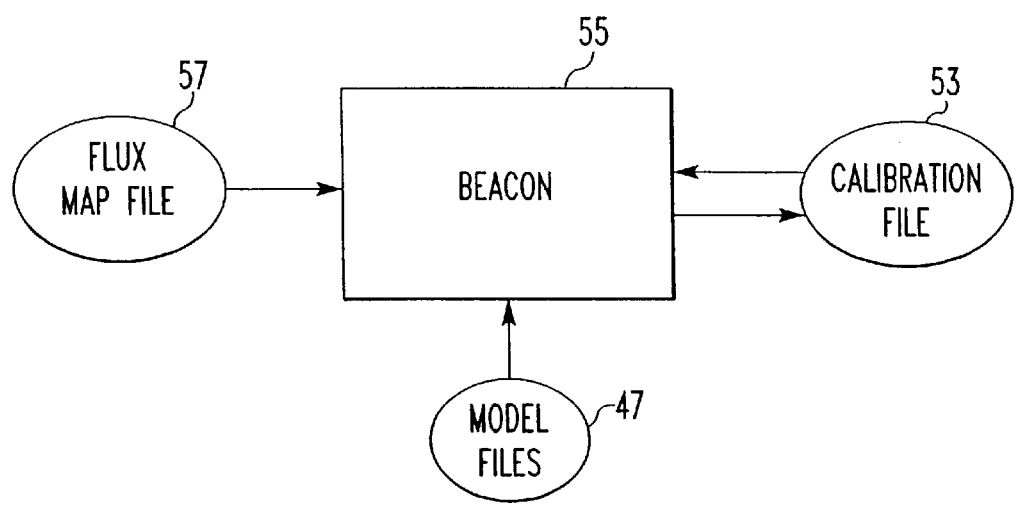
FIG. 5 illustrates schematically data flow during the follow on calibration phase of operation of the invention in accordance with the invention.

Periodically during operation, a calibration process is carried out as illustrated in FIG. 5. The BEACON foreground process 55 is used to generate the calibration information. The data required for this phase is a set of moveable detector measurement data and a set of thermocouple data consistent with the moveable detector information obtained from the flux map file 57 and an analytical nodal model consistent with the conditions of the moveable detector measurements obtained from the model files 47. The calibration process then analyzes the moveable detector information to generate the reference measured power distribution which is assumed to be truth. The relative power in an assembly is determined using the inlet temperature and the measured exit thermocouple temperatures consistent with the time frame that the moveable detector measurements were taken. The ratio of power in the assembly from the reference measured power distribution and the reference thermocouple measurement power is the mixing factor at that relative core power. The mixing factor coefficients from the calibration file 53 are modified so that the shape passes through the just calculated point at that relative power. The modified mixing factor coefficient is saved to the calibration file.

The present invention not only provides calibration of the thermocouples utilizing data from the current cycle, thereby avoiding any inaccuracies associated with the prior art technique of utilizing data from the previous fuel cycle, but also provides calibration over the full power range of the reactor rather than just at 100% power. This permits the BEACON system to more accurately determine the power distribution which in turn allows the reactor to be operated closer to various operating limitations.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the claims appended and any and all equivalents thereof.

What is claimed is:

1. A method of calibrating exit thermocouples distributed over a plurality of fuel assemblies in a nuclear reactor comprising the steps of:

repetitively recording temperatures measured by the thermocouples as reactor power increases during power ascension;

generating calibration factors from the temperatures measured during startup; and applying the calibration factors to subsequent measurements of temperature taken by the thermocouples.

2. The method of claim 1 wherein:

recording includes recording with each temperature measured for each thermocouple, the reactor power level at the time of the measurement and a predicted power at the thermocouple at the time of the temperature measurement using a three-dimensional nodal model of the reactor core;

generating calibration factors comprises generating a measured thermocouple power from each temperature measured for each thermocouple, generating a mixing factor for each temperature measured for each thermocouple by dividing the measured thermocouple power for each temperature measured for each thermocouple into the corresponding predicted power, and for each thermocouple fitting the mixing factors to a selected mixing factor function of reactor power; and applying the calibration factors comprises, for each subsequent thermocouple temperature measurement, converting the temperature measurement to a measured thermocouple power and adjusting the measured thermocouple power by a mixing factor value determined from the selected mixing factor function of reactor power for that thermocouple.

3. The method of claim 2 wherein the selected mixing factor function of reactor power is one of a linear function and a constant.

4. The method of claim 2 wherein the selected mixing factor function of reactor power is a quadratic function.

5. The method of claim 4 wherein the selected mixing factor function of reactor power is a linear function below a selected reactor power level and is then a said quadratic function.

6. The method of claim 5 including periodically adjusting the selected mixing factor function of reactor power for each thermocouple.

7. The method of claim 6 wherein adjusting the selected mixing factor function of reactor power comprises periodically generating a flux map of the reactor core at certain conditions, using the flux map and the three-dimensional nodal model at said certain conditions of the reactor core to generate a reference measured power distribution for the reactor core, generating a thermocouple measured temperature for each thermocouple at said certain conditions, converting each thermocouple measured temperature to a reference thermocouple power, establishing for each thermocouple an associated reference mixing factor by dividing a reference measured power for the thermocouple determined from the reference measured power distribution by the reference thermocouple power and adjusting the selected mixing factor function of reactor power for each thermocouple to pass through the associated thermocouple reference power.

8. The method of claim 7 comprising periodically adjusting the selected mixing factor function of reactor power for each thermocouple.

9. The method of claim 8 including periodically adjusting the selected mixing factor functions of reactor power for each thermocouple during startup.

10. The method of claim 7 including periodically adjusting the selected mixing factor functions of reactor power multiple times during startup.

11. The method of claim 7 comprising periodically adjusting the selected mixing factor functions of reactor power for the thermocouples after initial power ascension.

12. The method of claim 2 further including generating standard deviations for each mixing factor for each thermocouple for each measured temperature, fitting all of the standard deviations to a single selected function of assembly power.

13. The method of claim 10 wherein the selected function of assembly power is one of a quadratic function and a linear function of assembly power.

14. The method of claim 1 wherein the step of repetitively recording temperatures measured by the thermocouples as power increases during power ascension comprises recording temperatures for discrete ranges of power during power ascension and limiting the number of measured temperatures recorded for each range of power.

15. The method of claim 14 wherein recording temperatures for discrete ranges of power during power ascension comprise recording temperatures for ranges of about 5% power.

16. The method of claim 12 including determining the quality of the thermocouple data by using the standard deviations.

* * * * *